US008693826B2

(12) United States Patent
Edvell (10) Patent No.: US 8,693,826 B2
(45) Date of Patent: Apr. 8, 2014

(54) OPTICAL STRUCTURE WRITING SYSTEM (75) Inventor: Goran Lars Edvell, Holsworthy (AU)

(73) Assignee: Tyco Electronics Pty. Ltd. (AU)

( * ) Notice: Subject to any disclaimer, the term of this patent is extended or adjusted under 35 U.S.C. 154(b) by 0 days.

(21) Appl. No.: 13/212,402

(22) Filed: Aug. 18, 2011

(65) Prior Publication Data

US 2011/0299812 A1 Dec. 8, 2011

Related U.S. Application Data (63) Continuation of application No. 12/468,684, filed on May 19, 2009, now abandoned, which is a continuation of application No. 10/547,242, filed as application No. PCT/AU2004/000240 on Feb. 25, 2004, now abandoned.

(30) Foreign Application Priority Data

Feb. 25, 2003 (AU) ................................ 2003900836

(51) Int. Cl.
G02B 6/34 (2006.01)
G02B 6/02 (2006.01)
(52) U.S. Cl.
CPC ........ G02B 6/02133 (2013.01); G02B 6/02138 (2013.01)
USPC .......................................................... 385/37
(58) Field of Classification Search
None
See application file for complete search history.

(56) References Cited

U.S. PATENT DOCUMENTS 6,144,483 A * 11/2000 Allen et al. .................... 359/305
6,490,390 B1 12/2002 Wilcox
6,904,202 B1 6/2005 Johnson et al.
2003/0035623 A1 2/2003 Wilcox et al.
2005/0169599 A1 8/2005 Stepanov

FOREIGN PATENT DOCUMENTS

DE     19605062 C1   8/1997
FR      2768819 A1   3/1999
JP     2000121820 A  4/2000
JP     2002517768 T  6/2002
JP     2002519709 T  7/2002

(Continued)

OTHER PUBLICATIONS

EP Supplemental European Search Report for PCT/AU2004000240 mailed Jul. 22, 2009.

(Continued)

Primary Examiner — Hemang Sanghavi
(74) Attorney, Agent, or Firm — Perkins Coie, LLP (57) ABSTRACT The present invention relates to a system for writing an optical structure in a waveguide. The system including, means for splitting a light beam into two coherent writing beams, an optical circuit for directing the writing beams along substantially the same optical path in opposite directions such that they produce an interference pattern in an interference region substantially within the waveguide to write the optical structure, said optical circuit including at least two acousto-optic modulators (AOMs) configured to enable a controllable phase shift to be applied to a light beam propagating therethrough, the two AOMs being arranged such that, in use, each AOM shifts the phase of only one of the writing beams, to thereby provide a controllable phase difference between the writing beams.

31 Claims, 5 Drawing Sheets

(56) References Cited

FOREIGN PATENT DOCUMENTS

| WO | WO-97/21120 | A1 | 6/1997 |
| WO | WO-9829767 | A1 | 7/1998 |
| WO | WO-9836296 | A1 | 8/1998 |
| WO | WO-9922256 | A1 | 5/1999 |
| WO | WO-9945414 | A1 | 9/1999 |
| WO | WO-9945417 | A1 | 9/1999 |
| WO | WO-9963371 | A1 | 12/1999 |
| WO | WO-9967664 | A1 | 12/1999 |
| WO | WO-0144845 | A1 | 6/2001 |
| WO | WO-0239149 | A1 | 5/2002 |

OTHER PUBLICATIONS

AU Office Action mailed Jul. 17, 2008; AU Application Serial No. 2004/215321 by Redfern Optical Components Pty Ltd.

AU International Search Report for PCT/AU01/01441 mailed Jan. 3, 2002.

* cited by examiner

OPTICAL STRUCTURE WRITING SYSTEM

CROSS REFERENCE TO RELATED APPLICATIONS

This application is a continuation of U.S. patent application Ser. No. 12/468,684, filed May 19, 2009, entitled "OPTICAL STRUCTURE WRITING SYSTEM", which is a continuation of U.S. patent application Ser. No. 10/547,242, filed Aug. 25, 2005, entitled "OPTICAL STRUCTURE WRITING SYSTEM" by Goran Lars Edvell, which is a national phase filing based on PCT/AU2004/000240, filed Feb. 25, 2004, which in turn claims priority to Australian Patent Application No. 2003/900836, filed Feb. 25, 2003, all of which are incorporated herein by reference.

FIELD OF THE INVENTION

The present invention relates broadly to a system for writing an optical structure in a waveguide, to a method of writing an optical structure in a waveguide, and to an interferometer.

BACKGROUND OF THE INVENTION

Typically, the writing of optical structures such as Bragg gratings into a photosensitive material involves an interferometer in which two coherent light beams (typically in the UV wavelength range) are directed along separate optical paths and brought to interference substantially within the photosensitive material. Within the photosensitive material, refractive index changes are induced through the interaction between the light beams and the photosensitive material, with the refractive index profile being determined by the interference patterns.

In order to write complex optical gratings, e.g. in an optical fibre, a high contrast, phase stable and arbitrarily chirpable UV interference pattern is typically required. The design problem associated with the creation of such a UV interference pattern for the writing of optical gratings is multi-dimensional and it has been found to be non-trivial to design an optical system that can satisfy all criteria simultaneously while minimising errors in each dimension due to the non-ideal nature of optical and mechanical components.

The present invention seeks to provide an alternative system and method for writing an optical structure in a waveguide, which, in at least preferred embodiments, satisfies the requirements for writing structures with the required flexibility whilst minimising the sum of the errors terms.

SUMMARY OF THE INVENTION

Throughout this specification, any reference to "phaseshift" maybe a constant phaseshift or a time varying phaseshift, i.e. a dynamic phaseshift. Furthermore, it will be appreciated by a person skilled in the art that any reference to phase control can be read as frequency control since frequency and phase are closely related.

According to a first aspect of the present invention there is provided a system for writing an optical structure in a waveguide. The system including, means for splitting a light beam into two coherent writing beams, an optical circuit for directing the writing beams along substantially the same optical path in opposite directions such that they produce an interference pattern in an interference region substantially within the waveguide to write the optical structure, said optical circuit including at least two acousto-optic modulators (AOMs) configured to enable a controllable phase shift to be applied to a light beam propagating therethrough, the two AOMs being arranged such that, in use, each AOM shifts the phase of only one of the writing beams, to thereby provide a controllable phase difference between the writing beams.

The at least one AOM can be configured to shift the phase of each of the writing beams, or alternatively the AOMs can be configured to shift the phase of the same writing beam.

In one embodiment with two AOMs both writing beams propagate through both AOMs.

Preferably the system includes means for providing a relative movement between the waveguide and the interfering writing beams to allow writing of an extended optical structure in the waveguide. The system can further include means for providing a relative movement between the means for splitting the light beam and the interfering writing beams wherein, in use, the means for splitting the light beam and the waveguide undergo identical movement relative to the writing beams, and wherein a relative phase shift is induced between the writing beams to balance a velocity of variations in the interference pattern and a velocity of the movement of the waveguide relative to the writing beams.

The system can be configured to enable optical structures with varying phase and/or pitch to be written by controlling relative phase shift between the writing beams using the AOMs to detune the velocity balance between the variations in the interference pattern and the movement of the waveguide relative to the writing beams.

The AOMs can be arranged to enable dithering of the interference fringes in the interference pattern for writing optical structures of varying amplitude profile. The AOMs can be configured to move the interference region during writing of the optical structures.

In certain embodiments the AOMs can be configured to enable the angle between the converging writing beams to varied.

In certain embodiments the intensity of the writing beams is controlled using partial Bragg diffraction driving of at least one AOM.

Preferably the splitting means comprises a phase mask. The system can further include means for focusing the writing beams in the interference region.

Preferably the optical circuit is substantially arranged in a Sagnac interferometer format.

It is also preferable that the waveguide comprises an optical fibre.

In a second aspect the present invention provides method of writing an optical structure in a waveguide, the method including the steps of:

splitting a light beam into two coherent writing, beams, directing the two writing beams along substantially the same optical path in opposite directions, such that they produce an interference pattern in an interference region substantially within the waveguide; and controlling a phase difference between the two writing beams by selectively using at least two acousto-optic modulators (AOMs) to shift the phase of at least one of the writing beams.

Controlling the phase difference between the two writing beams can include using the two AOMs to shift the phase of the same writing beam. Alternatively controlling the phase difference between the two writing beams includes using the two AOMs to shift the phase of different writing beams.

The method can also include moving the waveguide relative to the interfering writing beams to write extended optical structures in the waveguide. The method can include moving a beam splitting means relative to the writing beams in concert with the waveguide, and inducing a relative phase shift between the writing beams, for balancing of a velocity of variations in the interference pattern and a velocity of the movement of the waveguide relative to the writing beams.

In some implementations the method can include detuning the extent of velocity balance between the variations in the interference pattern and the movement of the waveguide, by controlling the relative phase shift between the writing beams.

The method can also include dithering the interference fringes with respect to the optical waveguide using the at least one AOM.

The method may also include moving the interference region during writing of the optical structure using the at least one AOM. Furthermore the method can include changing the angle between the converging writing beams using the AOMs.

In certain embodiments the method includes controlling the intensity of the interfering writing beams using partial Bragg diffraction driving of at least one AOM.

The method can further include focusing of the writing beams in the interference region.

In a third aspect of the present invention there is provided an interferometer for writing an optical structure in a waveguide moving relative to interfering writing beams of the interferometer, the interferometer including at least two acousto-optic modulators (AOM) for introducing a controlled phase difference between the writing beams, wherein, in use, a phase error of an interference pattern created by the interferometer is less than about .+-0.10.degree. for a relative movement of the waveguide of about 100 mm. Preferably the phase error is about .+-0.3.degree.

Preferably the interferometer includes two AOMs.

In one embodiment the interferometer is arranged so the writing beams travel along substantially the same optical path in opposite directions, and wherein the AOMs are disposed such that, in use, both writing beams propagate through at least two AOMs in a manner such that each AOM shifts the phase of only one of the writing beams.

In a fourth aspect the present invention provides a waveguide including an optical structure written using any one of the methods described above.

Accordingly, in certain embodiments the system may exhibit a strong common mode rejection, improving the quality of the written grating while providing the flexibility of electrical phase control.

BRIEF DESCRIPTION OF THE DRAWINGS

Preferred embodiments of the present invention will now be described, by way of example only, with reference to the accompanying drawings, in which.

DETAILED DESCRIPTION OF THE EMBODIMENTS

The preferred embodiments described provide a system and method for writing a grating to an optical fibre that satisfies the requirements for writing a fibre grating with the required flexibility, whilst reducing the sum of the error terms introduced during the writing of the grating.

Figure 1:
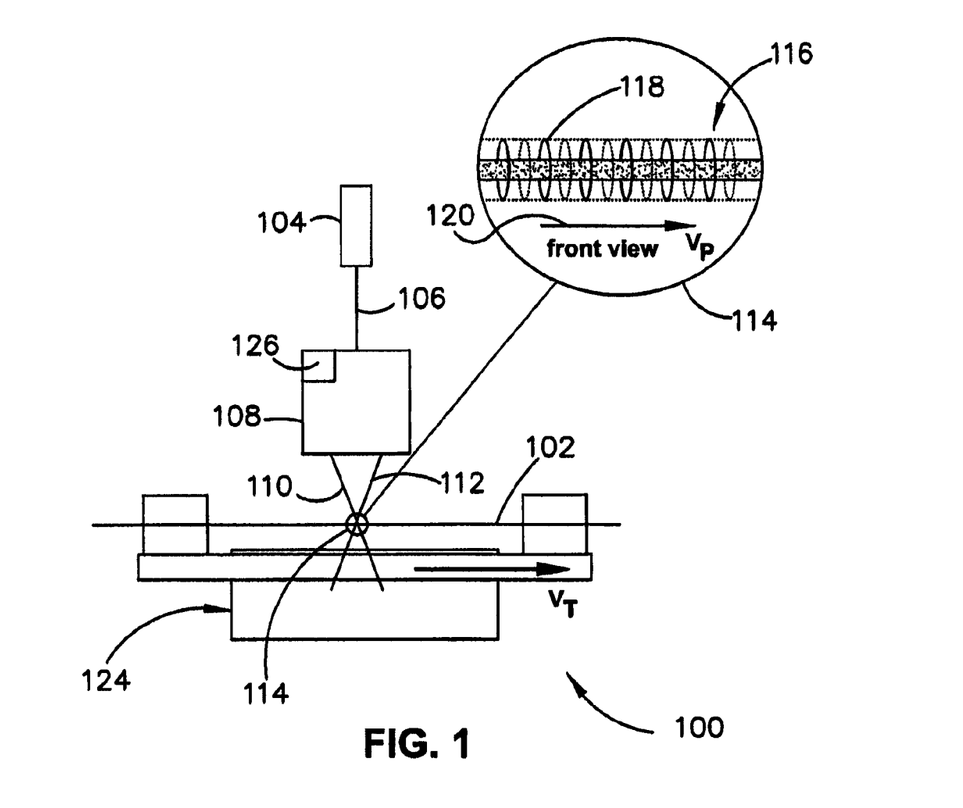
FIG. 1 is a schematic drawing of a conventional grating writing configuration.

FIG. 1 shows a grating writing configuration 100 for writing long optical gratings into an optical fibre 102. The system 100 comprises a UV laser source 104 for generating a laser beam 106 for writing the optical grating through photo-absorption induced refractive index changes in the optical fibre 102.

A suitable interferometer set up 108 is utilised to split the incoming laser 106 into two coherent beams 110, 112 and to bring the two writing beams 110, 112 to interference in an interference region 114 at the optical fibre 102. As is shown in the insert in FIG. 1, an interference pattern 116 is thus created in the interference region 114.

The interferometer set up 108 is further arranged to introduce a frequency offset between the writing beams 110, 112. As a result, the interference pattern 116 will not be static, but rather will continuously change. That is, the interference fringes e.g. 118 move "across" the interference region 114 with a velocity $v_P$ as indicated by arrow 120. The velocity $v_P$, depends, inter alia, on the relative phaseshift induced between the writing beams 110 and 112, and the interference angle between the writing beams 110, 112.

It will be appreciated by a person skilled in the art that if the velocity of the interference pattern change $v_P$ is matched to the velocity of the optical fibre 102, i.e. the velocity of the translation stage 114 $v_T$, a long optical grating of constant pitch can be written in the optical fibre 102.

In order to write e.g. a chirped grating with the system 100, it is necessary to change the relative phase shift between the writing beams 110, 112, and the pitch of the written grating is then varied accordingly as a function of the mismatch between $v_P$ and $v_T$.

As described in the background section of this specification, the system 100 is subject to multiple errors due to the non-ideal nature of the optical and mechanical components of the system 100. One significant error component is due to the non-ideal translation behaviour of the translation stage 124. If it is desired to write a grating of a specified design, and a control unit 126 of the interferometer set up 108 has been programmed accordingly, non-ideal behaviour of the translation stage result in deviations of the fibre velocity, i.e. the stage velocity $v_T$, from the ideal behaviour. This is sometimes referred to as translation phase errors in the written grating, when compared with the theoretical, desired design.

Figures 2A, 2B:
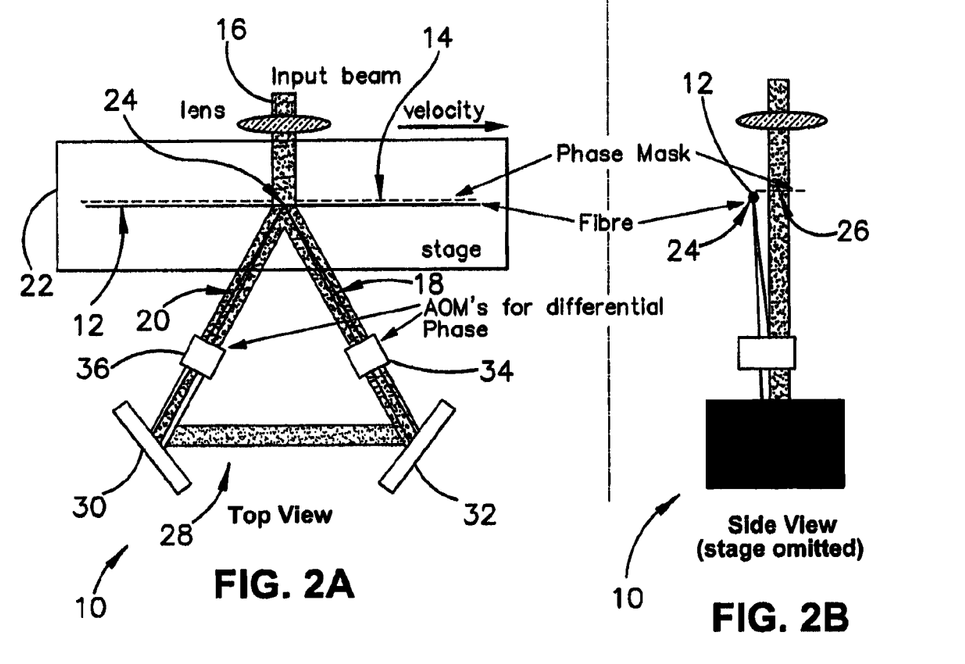
FIGS. 2A and 2B show schematic drawings of an exemplary grating writing system embodying the present invention, in plan and end views respectively.

FIGS. 2A and 2B show a schematic top view and end view respectively of a system 10 embodying the present invention for writing a grating into an optical fibre 12. Both the optical fibre 12 and a phasemask 14 used for splitting an incoming UV beam 16 into two coherent writing beams 18, 20 are mounted on the same translation stage 22. In use, an identical movement can therefore be provided for both the optical fibre 12 and the phasemask 14 relative to the remaining components of the system 10, in particular the incoming UV beam 16 and the two writing beams 18, 20.

It will be appreciated by the person skilled in the art that the Doppler shifts imposed on the writing beams 18, 20 are thus substantially the ones required to match the velocity of the optical fibre 12 to the velocity of the interference pattern change. It is noted that in the embodiment shown in FIGS. 2A and 2B, the recombination or interference point 24 is offset by a small amount in both the horizontal and vertical plane when compared with the splitting point 26 of the incoming UV beam 16 at the phasemask 14.

Thus, the interferometer configuration of the example embodiment is close to a Sagnac interferometer except that the returning beams are slightly off-set in the vertical and horizontal direction to allow them to recombine on the fibre 12 in a position away from the phasemask 14. This configuration has been found to display nearly the same magnitude of common mode rejection that a true Sagnac interferometer would. The closer the interferometer is to the true Sagnac interferometer, the better the common mode rejection will be. It is, therefore, desirable that the recombination point 24 is as close as possible to the splitting point 26 from the phasemask 18.

The beams 18, 20 may be focused to a high intensity spot in the recombination point 24 at the optical fibre 12, without damage to the phasemask 14. The system 10 further comprises two acousto-optic modulators (AOMs) 34, 36 for inducing a relative phase shift between the writing beams 18, 20.

For instance, because the recombination point 24 is moved forward off the phasemask 14 in the horizontal plane, a small relative frequency shift is applied to the AOMs 34, 36 to account for the small velocity mismatch between the optical fibre 12 and the travelling interference pattern at the recombination point 24. The velocity mismatch is introduced by the change in the angle under which the writing beams 18, 20 interfere, compared with a true Sagnac interferometer configuration, in which the recombination point 24 would be the same as the splitting point 26 at the phasemask 14.

It has been found, for example, that moving the recombination point 24 1 mm forward off the phasemask 14 in the horizontal plane still gives better than 99% translation phase error compensation. In the vertical plane, increased separation of the splitting point 26 and the recombination point 24 of the writing beams 18, 20 will increase sensitivity of the system 10 to roll, pitch and yaw in the translation stage 22, as well as to mechanical and thermal drift in optical components. Yet, even with a sizeable offset of about 5 mm, such an interferometer configuration is found to be sufficiently immune to roll, pitch and yaw.

In order to write a chirped grating, it is necessary to change the phase of one writing beam 18 relative to the other writing beam 20. Again, the AOMs 34, 36 are used to introduce the required relative phase shift. The AOMs 34, 36 can also be used to introduce apodisation in the written grating. It is noted that the AOMs 34, 36 introduce the required phase shift in the writing beams 18, 20 through Bragg diffraction at an acoustic wave. Each writing beam 18, 20 is frequency shifted in only one of the AOMs 34, 36, namely the first one in its respective path. On the pass through the other AOM, the Bragg condition will no longer be fulfilled for that AOM, and thus no further frequency shift occurs.

Alternatively or additionally, the AOMs 34, 36 may be used to dither the inference fringes in the interference pattern with respect to the fibre 12 for writing optical structures of varying amplitude profile, such as e.g. an apodised optical grating. Alternatively or additionally, the AOMs 34, 36 may be utilised to move the interference point during writing of the optical structures. This is achieved by altering the absolute frequency of the signal driving the AOMs, and importantly this can be done without effecting the alignment of the interferometer or the Bragg condition in the AOMs. Note that this can also be done independently of the relative frequency difference between the two beams which is used to effect phase and amplitude control of the written FBG. Alternatively or additionally, the AOMs 34, 36 may be used to control the intensity of the interfering beams utilising partial Bragg diffraction driving of one or both of the AOMs 34, 36.

Figure 3:
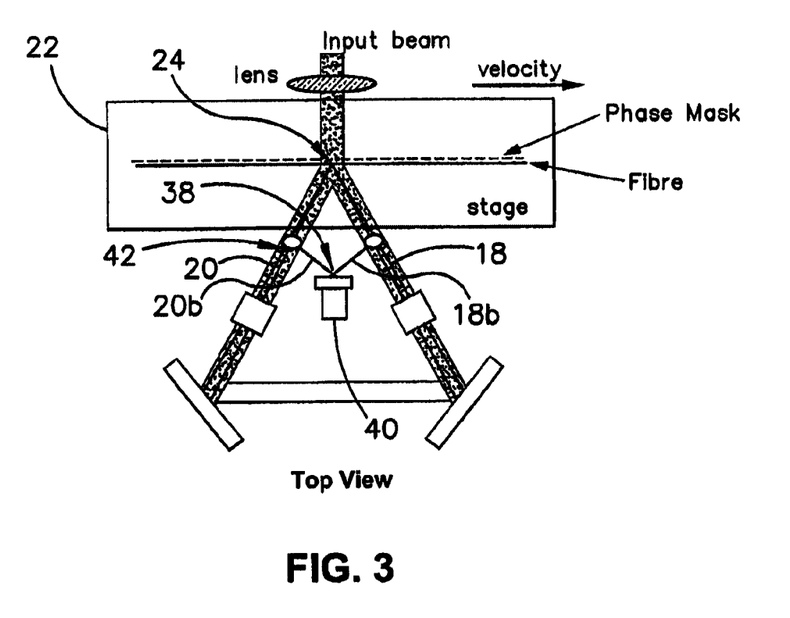
FIG. 3 is a schematic drawing of a modification of the grating writing system shown in FIG. 2 for obtaining comparative data illustrating the translation phase error compensation embodying the present invention.

To obtain a measure of the degree of phase stability of the interferometer incorporating the AOMs, the following data was obtained that is representative of the various operating states. As illustrated in FIG. 3, portions of the writing beams 18, 20 were tapped off in the "return" path of the writing beams 18, 20 prior to the translation stage 22. The tapped off portions 18b, 20b were then brought to interference utilising a stationary interferometer set-up 42 and the resulting interference pattern at the interference region 38 was analysed using an analyser 40.

Figure 4:
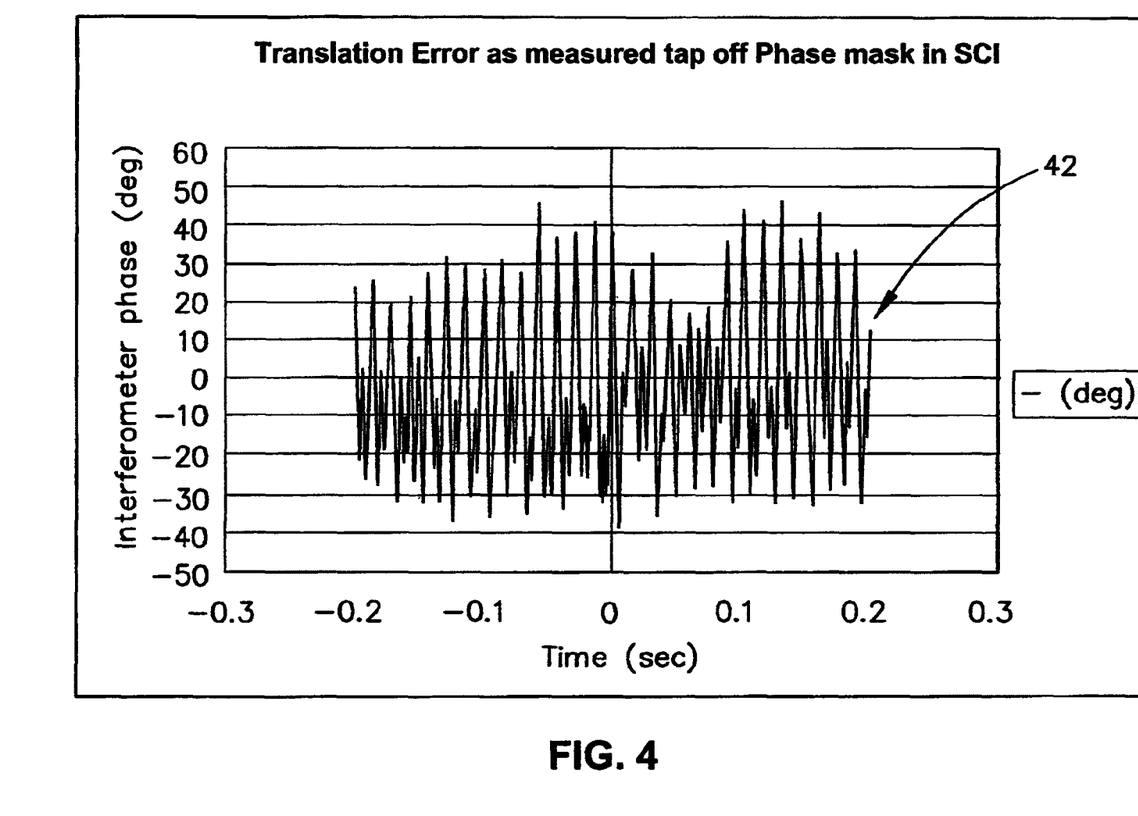
FIG. 4 is a plot of measured interferometer phase error as a function of stage movement over time, representing the uncompensated translation phase errors.

In FIG. 4 the measured interferometer phase errors as a function of stage movement over time in the resulting interference pattern of the tapped off writing beam portions 18B, 20B is shown. As can be seen from the plot 42, the measured interferometer phase errors are of the order of .+−0.40.degree., and are representative of the translation phase errors introduced by the movement of translation stage 22.

Figure 5:
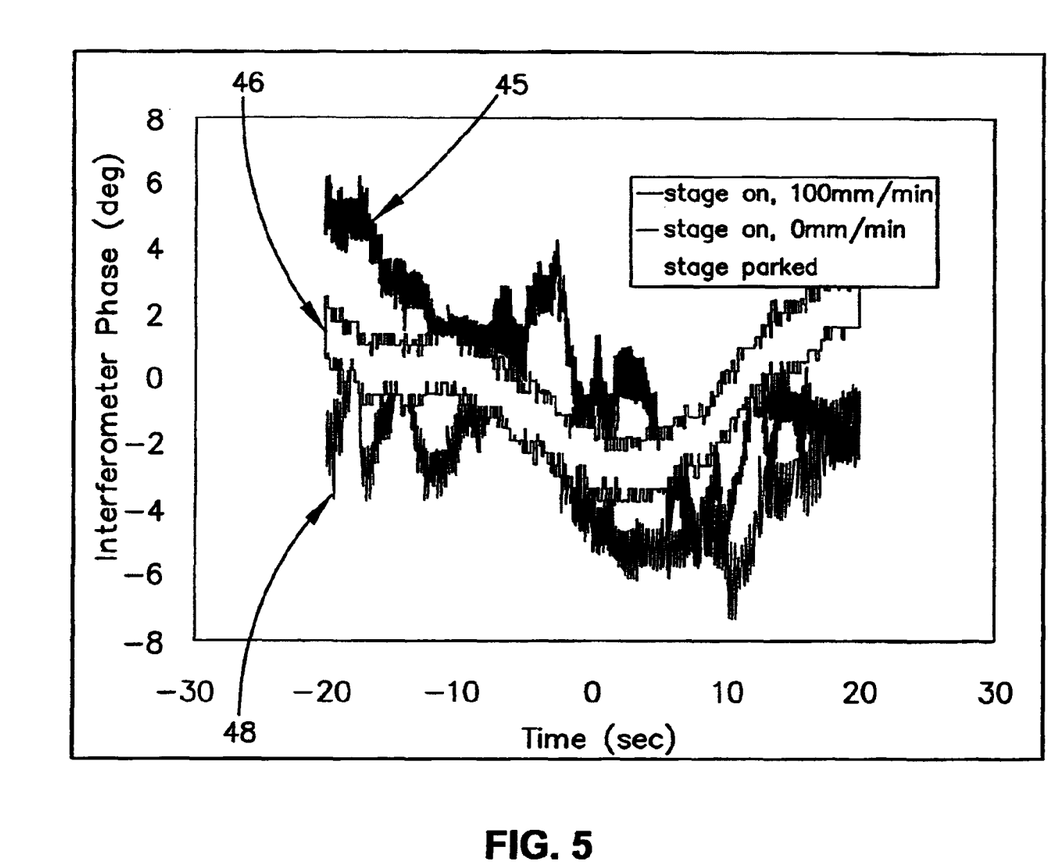
FIG. 5 shows plots of measured interferometer phase error as a function of stage movement over time for different translation stage settings, illustrating the compensated translation phase arrow embodying the present invention.

For comparison, FIG. 5 shows a plot 45 of the interferometer phase errors as measured at the recombination point 24, i.e. on the translation stage 22. As can be seen from FIG. 5, the measured interferometer phase errors are of the order of .+−0.3.degree.. Again, the measured interferometer errors are representative of the, now compensated, translation phase errors which will be experienced during the writing of a grating utilising the writing system 10. This performance was achieved with the presence of AOMs in the optical circuit and consequently, the performance is achieved whilst maintaining complete flexibility in FBG pitch and amplitude. For further comparison, additional plots 46, 48 are shown in FIG. 5. Plot 46 shows the measured interferometer phase errors for the translation stage 22 parked i.e. switched off. Plot 48 shows the measured interferometer phase errors for a switched on translation stage 22, but with the velocity set to zero. As can be seen from a comparison of plots 45, 46 and 48, the interferometer phase errors are substantially of the same order of magnitude under all those conditions. This demonstrates the high passive phase stability achievable, even with AOMs present, in preferred embodiments of the present invention.

It would be appreciated by those familiar with the art that the introduction of the AOMs in the preferred embodiment allows fringe control without introducing significant fringe noise thereby providing a rare combination of complete flexibility with high stability.

It will be appreciated by the person skilled in the art that numerous modifications and/or variations may be made to the present invention as shown in the specific embodiments without departing from the spirit or scope of the invention as broadly described. The present embodiments are, therefore, to be considered in all respects to be illustrative and not restrictive.

For example, other means for splitting the light beam into the coherent writing beams may be utilised in alternative embodiments of the present invention, provided that the alternative means for splitting the light beam modulates the relative phase of the writing beams as a result of relative movement of the splitting means and the writing beams.

Also, focusing of the writing beams in alternative embodiments may involve placing one or more optical lenses in the optical path or paths after the phasemask as an alternative or in addition to the optical lens (or indeed lenses) before the phasemask. Furthermore, the optical circuit in alternative embodiments may be arranged as a true Sagnac interferometer.

The preferred embodiment described herein includes two AOMs for controlling the phase difference between the writing beams, however in certain embodiments three or more AOMs can be used for this purpose.

Also, it will be appreciated that the optical circuit in alternative embodiments of the present invention may comprise other optical components in place of or in addition to the components shown in the preferred embodiment described. For example, other optical elements may be used to induce the relative phaseshifts between the writing beams such as electro-optic modulators, and/or other optical elements than mirrors may be used for directing the light beams.

In the claims that follow and in the summary of the invention, except where the context requires otherwise due to express language or necessary implication the word "comprising" is used in the sense of "including", i.e. the features specified may be associated with further features in various embodiments of the invention.

What is claimed is:

1. A system for writing an optical structure in a waveguide including:
   a splitter to split a light beam into two coherent writing beams,
   an optical circuit for directing the writing beams along substantially the same optical path in opposite directions such that they produce an interference pattern in an interference region substantially within the waveguide to write the optical structure, said optical circuit including at least two acousto-optic modulators (AOMs) disposed such that both writing beams propagate through each of the at least two AOMs, the AOMs being configured to enable a controllable phase shift to be applied to a light beam propagating therethrough, the two AOMs being arranged such that each AOM is adapted to shift the phase of only one of the writing beams, to thereby provide a controllable phase difference between the writing beams.

2. A system as claimed in claim 1 wherein the AOMs are configured to shift the phase of the same writing beam.

3. A system as claimed in claim 1, wherein the system creates a relative movement between the waveguide and the interfering writing beams to allow writing of an extended optical structure in the waveguide.

4. A system as claimed in claim 3, which further creates a relative movement between the splitter and the interfering writing beams wherein the splitter and the waveguide undergo identical movement relative to the writing beams, and wherein a relative phase shift is induced between the writing beams to balance a velocity of variations in the interference pattern and a velocity of the movement of the waveguide relative to the writing beams.

5. A system as claimed in claim 4 wherein the system is configured to enable optical structures with at least one of varying phase and pitch to be written by controlling relative phase shift between the writing beams using the AOMs to detune the velocity balance between the variations in the interference pattern and the movement of the waveguide relative to the writing beams.

6. A system as claimed in claim 1, wherein the AOMs are arranged to enable dithering of the interference fringes in the interference pattern for writing optical structures of varying amplitude profile.

7. A system as claimed in claim 1, wherein the AOMs are configured to move the interference region during writing of the optical structures.

8. A system as claimed in claim 1, wherein the AOMs are configured to enable the angle between the converging writing beams to be varied.

9. A system as claimed in claim 1, wherein the intensity of the writing beams is controlled using partial Bragg diffraction driving of at least one AOM.

10. A system as claimed in claim 1, wherein the splitter comprises a phase mask.

11. A system as claimed in claim 1, wherein the system further includes a focuser to focus the writing beams in the interference region.

12. A system as claimed in claim 1, wherein the optical circuit is substantially arranged in a Sagnac interferometer format.

13. A system as claimed in claim 1, wherein the waveguide comprises an optical fibre.

14. A system as claimed in claim 1, wherein the waveguide and the splitter are co-mounted substantially adjacent to one another to allow the splitter and the waveguide to undergo identical movement relative to the writing beams.

15. A system as claimed in claim 1, wherein the optical circuit further includes two reflectors, and wherein the two AOMs are disposed in the optical circuit between the two reflectors and the splitter.

16. A method of writing an optical structure in a waveguide, the method including the steps of:
    splitting a light beam into two coherent writing beams,
    directing the two writing beams along substantially the same optical path in opposite directions, such that they produce an interference pattern in an interference region substantially within the waveguide, the optical path comprising at least two acousto-optic modulators (AOMs) disposed such that both writing beams propagate through each of the AOMs; and
    controlling a phase difference between the two writing beams by selectively using the at least two AOMs to shift the phase of at least one of the writing beams, wherein each writing beam is shifted by a first AOM through which the writing beam passes, and is not shifted by a second AOM through which the writing beam passes.

17. A method as claimed in claim 16 in which control the phase difference between the two writing beams includes using the two AOMs to shift the phase of the same writing beam.

18. A method as claimed in claim 16 in which control the phase difference between the two writing beams includes using the two AOMs to shift the phase of different writing beams.

19. A method as claimed in claim 16 in which further includes moving the waveguide relative to the interfering writing beams to write extended optical structures in the waveguide.

20. A method as claimed in claim 19, wherein the method includes moving a beam splitting means relative to the writing beams in concert with the waveguide, and
    inducing a relative phase shift between the writing beams, for balancing of a velocity of variations in the interference pattern and a velocity of the movement of the waveguide relative to the writing beams.

21. A method as claimed in claim 20 wherein the method includes detuning the extent of velocity balance between the variations in the interference pattern and the movement of the waveguide, by controlling the relative phase shift between the writing beams.

22. A method as claimed in claim 16 wherein the method includes dithering the interference fringes with respect to the optical waveguide using the at least one AOM.

23. A method as claimed in claim 16 wherein the method includes moving the interference region during writing of the optical structure using the at least one AOM.

24. A method as claimed in claim 16 wherein the method includes changing the angle between the converging writing beams using the AOMs.

25. A method as claimed in claim 16 wherein the method includes controlling the intensity of the interfering writing beams using partial Bragg diffraction driving of at least one AOM.

26. A method as claim in claim 16 wherein the method further includes focusing of the writing beams in the interference region.

27. An interferometer for writing an optical structure in a waveguide moving relative to interfering writing beams of the interferometer, the interferometer including at least two acousto-optic modulators (AOMs) for introducing a controlled phase difference between the writing beams by selectively using the at least two AOMs to shift the phase of at least one of the writing beams, wherein each AOM is adapted to shift the phase of only one of the writing beams, wherein a phase error of an interference pattern created by the interferometer is less than about ±10° for a relative movement of the waveguide of about 100 mm.

28. An interferometer as claimed in claim 27, wherein the phase error is about ±3°.

29. An interferometer as claimed in claim 27 wherein the interferometer includes two AOMs.

30. A system as claimed in claim 27 wherein the interferometer is arranged so the writing beams travel along substantially the same optical path in opposite directions, and wherein the AOMs are disposed such that, in use, both writing beams propagate through at least two AOMs in a manner such that each AOM shifts the phase of only one of the writing beams.

31. A waveguide including an optical structure written using the method of claim 16.

* * * * *